(12) United States Patent
Kim et al.

(10) Patent No.: US 11,411,222 B2
(45) Date of Patent: Aug. 9, 2022

(54) CONDUCTIVE AGENT, SLURRY FOR FORMING ELECTRODE INCLUDING SAME, ELECTRODE, AND LITHIUM SECONDARY BATTERY MANUFACTURED USING SAME

(71) Applicants: LG Chem, Ltd., Seoul (KR); Korea Advanced Institute Of Science And Technology, Daejeon (KR)

(72) Inventors: Tae Gon Kim, Daejeon (KR); Seul Ki Kim, Daejeon (KR); Je Young Kim, Daejeon (KR); Jung Keun Yoo, Daejeon (KR); Seok Woo Jeon, Daejeon (KR); Jung Mo Kim, Daejeon (KR)

(73) Assignees: Korea Advanced Institute Of Science And Technology; LG Energy Solution, Ltd.

( * ) Notice: Subject to any disclaimer, the term of this patent is extended or adjusted under 35 U.S.C. 154(b) by 233 days.

(21) Appl. No.: 16/958,470

(22) PCT Filed: Jan. 28, 2019

(86) PCT No.: PCT/KR2019/001168
§ 371 (c)(1),
(2) Date: Jun. 26, 2020

(87) PCT Pub. No.: WO2019/147093
PCT Pub. Date: Aug. 1, 2019

(65) Prior Publication Data
US 2021/0005895 A1   Jan. 7, 2021

(30) Foreign Application Priority Data
Jan. 26, 2018 (KR) .......................... 10-2018-0009777

(51) Int. Cl.
*H01M 4/62* (2006.01)
*C01B 32/182* (2017.01)
(Continued)

(52) U.S. Cl.
CPC ........... *H01M 4/625* (2013.01); *C01B 32/182* (2017.08); *H01M 4/13* (2013.01); *H01M 4/362* (2013.01);
(Continued)

(58) Field of Classification Search
CPC ........ H01M 4/625; H01M 4/13; H01M 4/362; H01M 10/0525; H01M 2004/021;
(Continued)

(56) References Cited

U.S. PATENT DOCUMENTS

2009/0090640 A1   4/2009   Jang et al.
2010/0096595 A1*  4/2010   Prud'Homme ......... C01B 32/23
                                                  252/500

(Continued)

FOREIGN PATENT DOCUMENTS

JP    H11297329 A    10/1999
JP    2008257888 A   10/2008
(Continued)

OTHER PUBLICATIONS

Search report from International Application No. PCT/KR2019/001168, daed May 13, 2019.
(Continued)

*Primary Examiner* — Stewart A Fraser
(74) *Attorney, Agent, or Firm* — Lerner, David, Littenberg, Krumholz & Mentlik, LLP (57) ABSTRACT

A conductive agent, a slurry for forming an electrode, the slurry including the same, an electrode manufactured using the same, and a lithium secondary battery are provided. The conductive agent includes graphene flakes the maximum
(Continued)

peak of which is observed in a range of 24.5° to 26° of 2θ in a data graph obtained by a X-Ray Diffraction (XRD) analysis, wherein the aspect ratio of the average lateral size of the surfaces of the graphene flakes to the average thickness of the graphene flakes in a direction perpendicular to surfaces of the graphene flakes is 500 to 50,000.

10 Claims, 6 Drawing Sheets

(51) Int. Cl.
 H01M 4/13 (2010.01)
 H01M 4/36 (2006.01)
 H01M 10/0525 (2010.01)
 H01M 4/02 (2006.01)

(52) U.S. Cl.
 CPC ..... *H01M 10/0525* (2013.01); *C01B 2204/04* (2013.01); *C01B 2204/22* (2013.01); *C01P 2002/72* (2013.01); *C01P 2002/82* (2013.01); *C01P 2004/24* (2013.01); *C01P 2004/54* (2013.01); *H01M 2004/021* (2013.01)

(58) Field of Classification Search
 CPC .............. C01B 32/182; C01B 2204/04; C01B 2204/22; C01P 2002/72; C01P 2002/82; C01P 2004/24; C01P 2004/54
 See application file for complete search history.

(56) References Cited

U.S. PATENT DOCUMENTS

| | | | |
|---|---|---|---|
| 2010/0096597 A1 | 4/2010 | Prud'Homme et al. | |
| 2012/0171109 A1 | 7/2012 | Lee et al. | |
| 2013/0149605 A1 | 6/2013 | Kakehata et al. | |
| 2015/0057417 A1 | 2/2015 | Tour et al. | |
| 2015/0267030 A1 | 9/2015 | Nosker et al. | |
| 2015/0279506 A1 | 10/2015 | Wolfrum et al. | |
| 2016/0344015 A1 | 11/2016 | Kimura et al. | |
| 2016/0380270 A1 | 12/2016 | Lee et al. | |
| 2017/0158512 A1 | 6/2017 | Sohn et al. | |
| 2017/0217775 A1 | 8/2017 | Sohn et al. | |
| 2017/0218141 A1* | 8/2017 | Nosker | C01B 32/225 |
| 2020/0235380 A1* | 7/2020 | Jang | C01B 32/194 |

FOREIGN PATENT DOCUMENTS

| | | | |
|---|---|---|---|
| JP | 2016219414 A | 12/2016 | |
| KR | 20090086536 A | 8/2009 | |
| KR | 20110077606 A | 7/2011 | |
| KR | 20120077535 A | 7/2012 | |
| KR | 20130064019 A | 6/2013 | |
| KR | 20140069011 A | 6/2014 | |
| KR | 20150065854 A | 6/2015 | |
| KR | 20150070391 A | 6/2015 | |
| KR | 20150076093 A | 7/2015 | |
| KR | 20150077321 A | 7/2015 | |
| KR | 101652921 B1 | 8/2016 | |
| KR | 20170127240 A | 11/2017 | |
| WO | 2016039504 A1 | 3/2016 | |

OTHER PUBLICATIONS

An Jung-Chul et al., "Characterization of graphene nanoplatelets prepared from poly imidederived graphite", Materials Letters, vol. 161, Aug. 29, 2015, pp. 321-324.

European Search Report for Application No. EP 19744089, dated Dec. 16, 2020, 7 pages.

F. Kokai et al., "Ultrasonication fabrication of high quality multilayer graphene flakes and their characterization as anodes for lithium ion batteries", Diamond and Related Materials, vol. 29, Sep. 1, 2012, pp. 63-68.

* cited by examiner

CONDUCTIVE AGENT, SLURRY FOR FORMING ELECTRODE INCLUDING SAME, ELECTRODE, AND LITHIUM SECONDARY BATTERY MANUFACTURED USING SAME

CROSS-REFERENCE TO RELATED APPLICATIONS

The present application is a national phase entry under 35 U.S.C. § 371 of International Application No. PCT/KR2019/001168 filed Jan. 28, 2019, which claims the benefit of Korean Patent Application No. 10-2018-0009777, filed on Jan. 26, 2018, in the Korean Intellectual Property Office, the disclosures of which are incorporated herein in its entirety by reference.

TECHNICAL FIELD

The present invention relates to a conductive agent and a lithium secondary battery manufactured using the same, and more specifically, to a conductive agent including graphene flakes excellent in electrical conductivity, a slurry for forming an electrode, the slurry including the same, an electrode, and a lithium secondary battery manufactured using the same.

BACKGROUND ART

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used. In addition, research has been actively conducted on methods for manufacturing high density electrodes with higher energy density per unit volume as an electrode for such a high capacity lithium secondary battery.

In general, a high density electrode is prepared through a process for forming a mixture layer by applying a slurry including electrode active material particles having a size of a few μm to tens of μm on a substrate, followed by drying and roll-pressing. However, the electrode active material particles may be deformed by high pressure press applied in a roll-pressing step and the space between the particles may also be decreased, and thus, the permeability of an electrolyte into the mixture layer may be deteriorated.

In order to solve such problems, a conductive agent excellent in strength and electrical conductivity is used in addition to electrode active material particles in a process for forming a mixture layer of an electrode. When a conductive agent is used in manufacturing an electrode, the conductive agent is dispersed in a compressed electrode active material, fine pores between the active material particles are maintained to improve the permeability of an electrolyte. In addition, a conductive agent has high conductivity, and thus, may reduce resistance in a battery. In recent years, studies on using carbon nanotubes (CNT), graphene, carbon black, and the like as a conductive agent are being conducted.

A carbon nanotube, which is a kind of fine carbon fiber, is tubular carbon having a diameter of less than 1 μm. Due to the specific structure thereof, a carbon nanotube has high conductivity, tensile strength, and heat resistance, so that the use thereof is increasing. However, carbon nanotubes are easily agglomerated due to strong Van der Waals attraction acting therebetween, thereby having low solubility and dispersibility. In order to overcome such limitation, a method of introducing a functional group onto the surface of a carbon nanotube and the like have been designed. However, it is still difficult to commercialize carbon nanotubes as a conductive agent since side reactions may occur.

Graphene is a semi-metallic material of a layered structure formed with an arrangement in which carbon atoms are connected to a hexagonal shape by a sp2 bond in two dimensions. Graphene not only has excellent electrical conductivity, but also structural and chemical stability and excellent thermal conductivity. Also, graphene is composed of carbon, which is a relatively light element, so that it is easy to process a one-dimensional or two-dimensional nano-pattern. Most of all, a graphene sheet is cheap, and thus has excellent price competitiveness compared to conventional nanomaterials.

Due to the excellent properties of such graphene, various methods for more effectively mass-producing graphene from carbon-based materials such as graphite have been proposed or studied.

For example, methods such as a method for producing graphene by pulverizing graphite together with a dispersant have been proposed. However, graphite is excessively pulverized so that it is difficult to obtain graphene having a desired size and shape, and the kinds of dispersant which can be used are limited.

Therefore, it is necessary to develop graphene having electrical conductivity above a predetermined level while having high dispersibility and a conductive material using the same.

(Patent Document 1) Korean Patent Laid-Open Publication No. 10-2011-0077606

DISCLOSURE OF THE INVENTION

Technical Problem

An aspect of the present invention provides a conductive agent including graphene flakes excellent in electrical conductivity and capable of significantly improving dispersibility, a slurry for forming an electrode, the slurry including the same, an electrode, and a lithium secondary battery manufactured using the same.

Technical Solution

According to an aspect of the present invention, there is provided a conductive agent including graphene flakes the maximum peak of which is observed in a range of 24.5° to 26° of 2θ in a data graph obtained by a X-Ray Diffraction (XRD) analysis, wherein the aspect ratio of the average lateral size of the surfaces of the graphene flakes to the average thickness of the graphene flakes in a direction perpendicular to surfaces of the graphene flakes is 500 to 50,000.

At this time, the average thickness of the graphene flakes may be 1 nm to 10 nm.

Meanwhile, the graphene flakes may have an average ratio of the maximum peak intensity of a D band at 1360±50 $cm^{-1}$ to the maximum peak intensity of a G band at 1580±50 $cm^{-1}$ of 0.06 to 0.5, obtained by Raman spectroscopy using a laser having a wavelength of 532 nm.

According to another aspect of the present invention, there are provided a slurry for forming an electrode, an electrode manufactured using the same, and a lithium secondary battery, wherein the slurry includes an electrode active material, a binder, a dispersion medium, and the conductive agent.

Advantageous Effects

A conductive agent according to the present invention includes graphene flakes, the maximum peak of which is observed in a range of 24.5° to 26° of 2θ in a data graph obtained by an X-Ray Diffraction (XRD) analysis, and thus, is excellent in delamination and crystallinity. In addition, the conductive agent includes graphene flakes satisfying an appropriate level of aspect ratio, which is the ratio of the lateral size of the surfaces of the graphene flakes to the thickness of the graphene flakes in a direction perpendicular to surfaces of the graphene flakes, and thus, has high dispersibility to be uniformly placed in an electrode. As a result, the electrical conductivity in a battery may be improved.

In addition, even when a small amount of a slurry for forming an electrode including the conductive agent is used, dispersibility and viscosity are high while the electrical conductivity is maintained above a predetermined level, so that electrode adhesion may be also improved.

BEST MODE FOR CARRYING OUT THE INVENTION

Hereinafter, the present invention will be described in more detail to facilitate understanding of the present invention.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Conductive Agent

A conductive agent according to the present invention includes graphene flakes, the maximum peak of which is observed in a range of 24.5° to 26° of 2θ in a data graph obtained by a X-Ray Diffraction (XRD) analysis, wherein the aspect ratio of the average lateral size of the surfaces of the graphene flakes to the average thickness of the graphene flakes in a direction perpendicular to surfaces of the graphene flakes is 500 to 50,000.

In general, an electrode for a secondary battery including a conductive agent is prepared by preparing a slurry for forming an electrode including the conductive agent, and then applying the slurry for forming an electrode on a substrate, followed by drying and roll-pressing. Therefore, only when the conductive agent is uniformly dispersed in the slurry for forming an electrode and the slurry maintains a predetermined level of viscosity, the conductive agent is uniformly dispersed on the surface of a substrate to improve electrical conductivity.

However, in the case of graphene, which is typically used as a conductive agent, the delamination thereof as a single layer is not properly achieved, thereby deteriorating dispersibility as well as the viscosity of a slurry for forming an electrode including the same.

Figure 1:
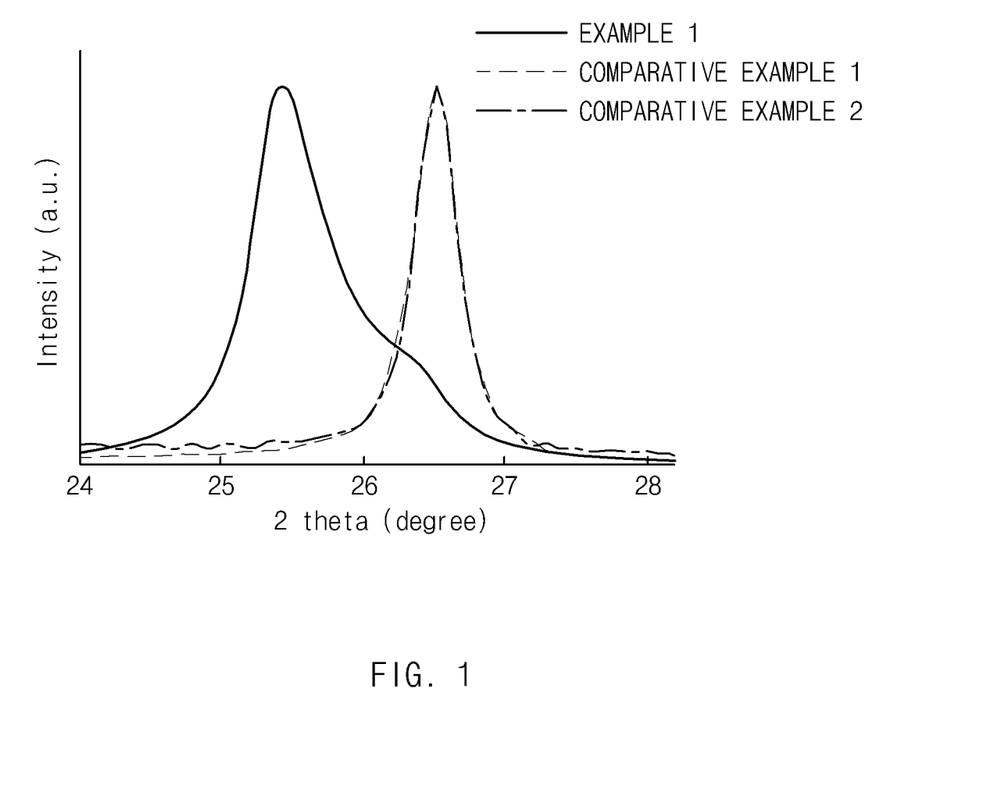
FIG. 1 is a data graph obtained by x-ray diffraction (XRD) of the graphene flakes manufactured in Examples 1 and Comparative Examples 1 and 2 of the present invention.

Therefore, in the present invention, graphene flakes, the maximum peak of which is observed in a range of 24.5° to 26° of 2θ in a data graph obtained by a X-Ray Diffraction (XRD) analysis, are used as the conductive agent of the present invention (see FIG. 1).

The X-Ray Diffraction (XRD) analysis may be derived from results measured by using a thin film X-ray diffraction analyzer (Rigaku Ultima IV). The measurement may be performed by scanning at 0.2° intervals by having an applied voltage of 40 kV, an applied current of 40 mA, and a range of 2θ to be measured of 24° to 28°. At this time, a variable divergence slit of 2 mm may be used as a slit.

Referring to FIG. 1, the graphene flakes according to the present invention exhibit a broad maximum peak when the range of 2θ is 24.5° to 28°, more preferably in the range of 25° to 26°. In the present specification, a maximum peak refers to a peak having the highest intensity value in a range of 2θ.

The graphene flakes of the present invention have the maximum peak in the above range of 2θ because when single-layered thin films that have been de-laminated from graphite are re-laminated, interlayer spacing between re-laminated single-layered thin films is increased due to a dispersant adsorbed between layers or due to a newly-formed pore structure. Accordingly, it has been confirmed that the graphene flakes according to the present invention have been sufficiently de-laminated and are formed in the form of a single layer.

Meanwhile, graphene flakes which have not been sufficiently de-laminated are observed to have a maximum peak at around 26.5° as in the case of graphite before de-lamination.

Meanwhile, the graphene flakes may have a Full Width at Half-Maximum (FWHM) of 0.5° to 5°, the Full Width at Half-Maximum (FWHM) of the maximum peak in a range of 24.5° to 26° of 2θ in a data graph obtained by an X-ray diffraction analyzer (Rigaku Ultima IV).

In the present invention, the Full Width at Half-Maximum (FWHM) is a numerical value of a peak width at ½ position of the maximum peak in the range of 24.5° to 26° of obtained by X-ray diffraction of the graphene flakes. Even through the thin films de-laminated from graphite are re-laminated during the preparation of graphene flakes, if interlayer spacing between the thin films re-laminated is not uniform, the corresponding Full Width at Half-Maximum value is increased. At this time, as the thin films are re-laminated with non-uniform interlayer spacing, the degree of de-lamination is further increased. Therefore, it is desirable that the Full Width at Half-Maximum value is 0.5° to 5°.

Meanwhile, the aspect ratio of the average lateral size of the surfaces of the graphene flakes to the average thickness of the graphene flakes in a direction perpendicular to surfaces of the graphene flakes may be 500 to 50,000, preferably 1,000 to 50,000. This is because, when the graphene flakes are present in the form of a plate, the average lateral size forming a surface is 5 μm to 50 μm and the average thickness of the graphene flakes is 1 nm to 10 nm.

At this time, the lateral size and the thickness of the graphene flakes may be measured with an atomic force microscope (AFM), and the average lateral size and the average thickness may be statistically calculated through direct measurements from images acquired during the AFM measurement. For example, hundreds of or thousands of graphene flakes are observed, and then the lateral size and the thickness of the observed graphene flakes are measured respectively. Thereafter, according to the order of the length thereof, some graphene flakes at a top portion and some graphene flakes at a bottom portion are collected. Thereafter, the average lateral size and the average thickness of the graphene flakes may be calculated by averaging the lateral size and the thickness of the collected graphene flakes, respectively.

When the aspect ratio is less than 500, de-lamination of graphene flakes is not excellent so that it may be difficult to form a conductive network that is minimal for the expression of electrical conductivity. When greater than 50,000, since the area of the graphene flakes is too large for electrolytic ions to access an active material, diffusion resistance of the electrolytic ions may be increased.

Meanwhile, the graphene flakes of the present invention may have an average ratio of 0.06 to 0.5, the ratio of the maximum peak intensity of a D band at $1360\pm50$ $cm^{-1}$ to the maximum peak intensity of a G band at $1580\pm50$ $cm^{-1}$, preferably 0.06 to 0.4, obtained by a Raman spectroscopy analysis method using a laser having a wavelength of 532 nm.

The Raman spectroscopy analysis method is a method for analyzing the crystallinity of graphene flakes, and is a useful method for analyzing the surface state of graphene flakes. In a Raman spectrum, a peak present in a region near the wave number $1580\pm50$ $cm^{-1}$ is referred to as a G peak, which is a peak indicating an $sp^2$ bond of graphene flakes. Meanwhile, a peak present in a region near the wave number $1360\pm50$ $cm^{-1}$ in a Raman spectrum is referred to as a D peak, which is a peak indicating an $sp^3$ bond of graphene flakes. When the $sp^2$ bond to a hexagonal mesh surface on a graphite layer is broken and thus the sp3 bond is formed, the D peak increases. Accordingly, when the ratio of the maximum peak intensity of a D-band at $1360\pm50$ $cm^{-1}$ to the maximum peak intensity of a G-band at $1580\pm50$ $cm^{-1}$ is in the above range, graphene flakes significantly de-laminated while having minimized damage to intrinsic crystallinity thereof may be provided.

Also, the oxygen content of the graphene flakes may be 5 atom % to 10 atom %, preferably 5.5 atom % to 10 atom %, more preferably 6 atom % to 10 atom %. The content of oxygen in graphene flakes is measured by an X-ray photoelectron spectroscopy (XPS) method. Oxygen is contained in the graphene flakes because, when the graphene flakes are de-laminated from graphite, a surfactant including an oxygen functional group is adsorbed on the surfaces of the graphene flakes. Meanwhile, when oxygen is contained in the graphene flakes in the above range, electrical repulsion is generated so that the graphene flakes may be further uniformly dispersed in a slurry for forming an electrode.

The conductive agent according to the present invention may further include other conductive materials in addition to the graphene flakes. For example, a conductive material such as graphite; a carbon-based material such as carbon black, carbon nanotubes, acetylene black, Ketjen black, channel black, furnace black, lamp black, and thermal black; a conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a polyphenylene derivative may be used. Specific examples of a commercially available conductive material may include acetylene black series (products of Chevron Chemical Company), denka black (product of Denka Singapore Private Limited, Gulf Oil Company, etc.,), ketjen black, EC series (product of Armak Company), Vulcan XC-72 (product of Cabot Company), and Super P (product of Timcal company).

Hereinafter, a method for preparing a conductive agent will be described. The conductive agent may be prepared thorough steps of (1) preparing an ion solution, (2) preparing a graphite mixed solution, and (3) obtaining graphene flakes. Hereinafter, each step will be described.

(1) Preparing Ion Solution

The ion solution may be prepared by mixing an organic solvent, naphthalene, and potassium (K).

The naphthalene and the potassium (K) are used to form a potassium (K) complex. Electrons of the potassium (K) are transferred to the naphthalene to be ionized, and then are coordinated with molecules of the organic solvent to form a potassium (K) complex. The potassium (K) may be included in the ion solution at a concentration of 0.1 to 2 M, preferably 1 to 2 M, to form a complex. When the potassium (K) is included in the above range, an insertion reaction of the potassium complex into an interlayer of mixed graphite may be performed.

The organic solvent is used to disperse the potassium (K) complex and graphite which is added to the ion solution, and used as a component of the potassium (K) complex at the same time. Any organic solution may be used without limitation as long as it does not cause side reactions with the potassium (K) complex and the graphite. Preferably, an aprotic organic solvent may be used.

For example, the organic solvent may include tetrahydrofuran (THF), acetonitrile, dimethylformamide (DMF), dimethylacetamide (DMA), N-methyl-2-pyrrolidone (NMP), methyl ethyl ketone (MEK), pyridine, quinoline, xylene, chloroform, ammonia, toluene, benzene, dimethylsulfoxide (DMSO), propylene carbonate, and the like. The above materials may be used alone or in combination. More preferably, the organic solvent may include tetrahydrofuran.

(2) Preparing Graphite Mixed Solution

The graphite mixed solution is prepared by mixing graphite in the ion solution prepared through the step (1).

More specifically, the ion solution was prepared in a glove box in an argon (Ar) atmosphere under a temperature condition of 25° C. to 40° C., and then the graphite was added to the ion solution at a concentration in the range of 30 mg/ml to 150 mg/ml, preferably 35 mg/ml to 150 mg/ml, more preferably 35 mg/ml to 145 mg/ml.

At this time, natural graphite or artificial graphite may be used as the graphite. The graphite may be used in a processed form, such as powder, mass, or foil. The graphite is added at a concentration of the above range in consideration of solubility and viscosity in the ionic solution. The concentration of the graphite to be added may vary according to experiment conditions.

When the ion solution is added with the graphite, the potassium (K) complex dissolved in the ion solution is inserted between layers of graphite, thereby weakening Van der Waals attraction, so that de-lamination of the graphite may be improved.

(3) Obtaining Graphene Flakes

The graphite mixed solution may be subjected to mixing to obtain the graphene flakes. The mixing includes processes such as stirring, sonication dispersion, and centrifugation.

More specifically, the graphene flakes may be obtained through the following steps.

First, the graphite mixed solution is stirred in a glove box for 5 hours to 10 hours. Then, the solvent is removed from the ion solution except for solid components such as graphite in which the potassium complex is inserted between layers thereof, and washing may be performed using a non-polar or low-polar solvent capable of dissolving naphthalene. For example, tetrahydrofuran (THF) and cyclohexane may be used, and preferably the solid components are washed with cyclohexane.

The washed solid components and polyvinylpyrrolidone (PVP) are mixed in a dimethylsulfoxide (DMSO) solvent, and using a water tank-type ultrasonic device, the graphite is de-laminated into a single-layered structure through sonication dispersion for 10 minutes to 60 minutes.

In order to separate only the de-laminated single layered structure, centrifugation is performed for 30 minutes to an hour at 2000 rpm using a centrifugal separator (Hanil Science Combi-514R). After the centrifugation, only an upper layer portion is separated.

Materials in the separated upper layer portion were once again subjected to centrifugation for 30 minutes to an hour at 10000 rmp using the centrifugal separator (Hanil Science Combi-514R). Thereafter, residual solvent remaining in the upper layer portion is removed to obtain graphene flakes.

Meanwhile, the graphene flakes are injected into a N-Methyl-2-pyrrolidone (NMP) solvent to a concentration of 0.5 mg/ml to 5 mg/ml, and through sonification dispersion for 5 minutes to 20 minutes using a water tank type ultrasonic device, may be prepared dispersed in the solvent.

Slurry for Forming Electrode

Hereinafter, a slurry for forming an electrode will be described. The slurry for forming an electrode includes an electrode active material, a binder, a dispersion medium, and the conductive agent. Since the conductive agent is the same as that described above, a detailed description thereof will be omitted.

Meanwhile, the conductive agent may be included in an amount of 0.05 parts by weight to 2.0 parts by weight, preferably 0.3 parts by weight to 1.5 parts by weight, more preferably 0.5 parts by weight to 1.3 parts by weight based on 100 parts by weight of solid components in the slurry for forming an electrode except for the dispersion medium. When the conductive agent is included in the above range, conductivity may be improved and viscosity may be maintained to be above a predetermined level.

In the slurry for forming an electrode, the electrode active material may be any electrode active material typically used as a positive electrode active material or a negative electrode active material of a secondary battery.

Specifically, when the slurry for forming an electrode is for forming a positive electrode, the electrode active material is a compound capable of reversible intercalation and de-intercalation of lithium, and may specifically include a lithium composite metal oxide containing one or more metals such as cobalt, manganese, nickel or aluminum, and lithium.

More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y1}Mn_{Y1}O_2$ (wherein $0<Y1<1$), $LiMn_{2-z1}Ni_{z1}O_4$ (wherein $0<Z1<2$), etc.), a lithium-nickel-cobalt-based oxide (e.g., $LiNi_{1-Y2}Co_{Y2}O_2$ (wherein $0<Y2<1$), etc.), a lithium-manganese-cobalt-based oxide (e.g., $LiCo_{1-Y3}Mn_{Y3}O_2$ (wherein $0<Y3<1$), $LiMn_{2-z2}Co_{z2}O_4$ (wherein $0<Z2<2$, etc.), a lithium-nickel-manganese-cobalt-based oxide (e.g., $Li(Ni_{p1}Co_{q1}Mn_{r1})O_2$ (wherein $0<p1<1$, $0<q1<1$, $0<r1<1$, $p1+q1+r1=1$) or $Li(Ni_{p2}Co_{q2}Mn_{r2})O_4$ (wherein $0<p2<2$, $0<q2<2$, $0<r2<2$, $p2+q2+r2=2$), etc.), or a lithium-nickel-cobalt-transition metal (M) oxide (e.g., $Li(Ni_{p3}Co_{q3}Mn_{r3}M_{S1})O_2$ (wherein M is selected from the group consisting of Al, Fe, V, Cr, Ti, Ta, Mg, and Mo, and p3, q3, r3, and s1 are each an atomic fraction of independent elements, and $0<p3<1$, $0<q3<1$, $0<r3<1$, $0<s1<1$, $p3+q3+r3+s1=1$, etc.) and the like, and any one thereof or a compound of two or more thereof may be included.

Among these, due to the fact that the capacity properties and stability of a battery may be increased, the lithium composite metal oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or a lithium nickel cobalt aluminum oxide (e.g., $LiNi_{0.8}Co_{0.15}Al_{0.05}O_2$, etc.), and the like. When considering an remarkable improvement effect according to the control of type and content ratio of constituent elements forming a lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and the like, and any one thereof or a mixture of two or more thereof may be used.

When the slurry for forming an electrode is for forming a negative electrode, the electrode active material is a compound capable of reversible intercalation and de-intercalation of lithium, and may be a negative electrode active material such as a composite including a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_x(0<x=2)$, $SnO_2$, vanadium oxide, lithium titanium oxide, and lithium vanadium oxide; or a composite including the metallic compound and the carbonaceous material such as a Si—C composite or a Sn—C composite, and any one thereof or a mixture of two or more thereof may be used.

Also, a metallic lithium thin film may be used as the negative electrode active material. Furthermore, both low crystalline carbon and high crystalline carbon may be used as the carbon material. Typical examples of the low crystalline carbon may include soft carbon and hard carbon, and typical examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

Meanwhile, the electrode active material may be included in an amount of 95.5 parts by weight to 99 parts by weight, preferably 96 parts by weight to 98.7 parts by weight, more preferably 97 parts by weight to 98 parts by weight based on 100 parts by weight of solid components in the slurry for forming an electrode except for the dispersion medium. When the electrode active material is included in the above range, capacity of a predetermined level or higher may be maintained and the binder and the conductive agent are contained above a predetermined level so that the adhesion and conductivity to an electrode current collector may be improved.

The binder is a component for assisting in coupling between an electrode active material, a conductive agent, and a current collector. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, fluorine rubber, various copolymers thereof, and the like.

Typically, the binder may be included in an amount of 0.8 parts by weight to 3.0 parts by weight, preferably 1.0 parts by weight to 2.5 parts by weight, more preferably 1.0 parts by weight to 2.2 parts by weight based on 100 parts by weight of solid components in the slurry for forming an electrode except for the dispersion medium. When the binder is included in the above range, the adhesion between electrode active materials and between an electrode active material and a conductive agent may be improved, and furthermore, the adhesion to a current collector may be improved.

The dispersion medium may be a solvent commonly used in the art. Examples thereof may include an organic solvent such as N-methyl-2-pyrrolidine (NMP), dimethyl sulfoxide (DMSO), isopropyl alcohol, and acetone, or water, and the like, and any one thereof or a mixed solvent of two or more thereof may be used. The dispersion medium is used to dissolve or disperse the electrode active material, the conductive agent, and the binder in consideration of the applying thickness and preparing yield of the slurry for forming an electrode. For example, the dispersion medium may be included in an amount such that the concentration of solid components including the electrode active material, the conductive agent and optionally the binder is 40 wt % to 80 wt %, preferably 40 wt % to 70 wt %, more preferably 50 wt % to 65 wt %.

Meanwhile, when the solid components except for the dispersion medium are included in the slurry for forming an electrode in an amount of 50 parts by weight to 65 parts by weight based on 100 parts by weight of the slurry for forming an electrode, the viscosity of the slurry for forming an electrode may be 5,000 cPs to 35,000 cPs, preferably 10,000 cPs to 35,000 cPs, more parts by weight 10,000 cPs to 30,000 cPs under a temperature condition of 24° C. to 26° C. When the viscosity of the slurry for forming an electrode is in the above range, the solid components except for the dispersion medium are uniformly dispersed, and the slurry for forming an electrode may be applied in a uniform thickness when applied on a current collector.

Electrode

Hereinafter, an electrode will be described.

The electrode of the present invention includes an electrode current collector, and an electrode active material layer formed on the electrode current collector. More specifically, the electrode active material layer includes an electrode active material and the conductive agent.

The electrode may be a positive electrode or a negative electrode, and more specifically a positive electrode. The descriptions of the electrode active material and the conductive agent are the same as those described above, and thus, detailed descriptions thereof will be omitted.

For example, the electrode may be manufactured by a conventional method for manufacturing an electrode except that an electrode active material layer is formed using the slurry for forming an electrode.

Specifically, the electrode may be manufactured by applying the slurry for forming an electrode on an electrode current collector, followed by drying, or may be manufactured by casting the slurry for forming an electrode on a separate support and then laminating a film separated from the support on the electrode current collector.

The electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the electrode current collector may typically have a thickness of 3 μm to 500 μm, and microscopic irregularities may be formed on the surface of the electrode current collector to improve the adhesion of a positive electrode active material. For example, the electrode current collector may be used in various forms such as a film, a sheet, a foil, a net, a porous body, a foam, a non-woven body, and the like.

Lithium Secondary Battery

Next, a lithium secondary battery according to the present invention will be described.

The lithium secondary battery specifically includes a positive electrode, a negative electrode disposed to face the positive electrode, a separator interposed between the positive electrode and the negative electrode, and an electrolyte. At least one of the positive electrode and the negative electrode may be manufactured by using a slurry for forming an electrode including the conductive agent. Meanwhile, the lithium secondary battery may further selectively include a battery container accommodating an electrode assembly composed of the positive electrode, the negative electrode, and the separator, and a sealing member for sealing the battery container. Meanwhile, the descriptions of the positive electrode and the negative electrode are the same as those described above, and thus, detailed descriptions thereof will be omitted.

The separator is to separate a negative electrode and a positive electrode and to provide a movement path for lithium ions. Any separator may be used without particular limitation as long as it is typically used as a separator in a secondary battery. Particularly, a separator having high moisture-retention ability for an electrolyte as well as low resistance to the movement of electrolyte ions is preferable. Specifically, as the separator, a porous polymer film, for example, a porous polymer film prepared from a polyolefinbased polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Also, a coated separator including a ceramic component or a polymer material may be used to secure heat resistance or mechanical strength, and may be selectively used having a single layered or a multi-layered structure.

Examples of the electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which are typically used in the manufacturing of a lithium secondary battery.

Specifically, the electrolyte may include a non-aqueous organic solvent and a lithium salt.

Any non-aqueous organic solvent may be used as the non-aqueous organic solvent without particular limitation as long as it may serve as a medium through which ions involved in an electrochemical reaction of a battery may move. Specifically, as the non-aqueous organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these, a carbonate-based solvent is preferable, and a mixture of a cyclic carbonate (e.g., ethylene carbonate or propylene carbonate) having high ionic conductivity and high dielectric constant, which may increase charging/discharging performance of the battery, and a low-viscosity linear carbonate-based compound (e.g., ethylmethyl carbonate, dimethyl carbonate, or diethyl carbonate) is more preferable. In this case, the performance of the electrolyte may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ may be used as the lithium salt. It is preferable that the lithium salt is used in a concentration range of 0.1 M to 2.0 M. When the concentration of the lithium salt is in the above range, the electrolyte has appropriate conductivity and viscosity, so that excellent electrolyte performance may be exhibited and lithium ions may effectively move.

In the electrolyte, in order to improve lifetime properties of a battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in addition to the electrolyte components.

Accordingly, according to another embodiment of the present invention, a battery module including the lithium secondary battery as a unit cell and a battery pack including the same are provided.

The battery module or the battery pack may be used as a power source of at least one medium-and-large sized device such as a power tool; electric cars including an electric vehicle (EV), a hybrid electric vehicle (HEV), and a plug-in hybrid electric vehicle (PHEV); or a power storage system.

MODE FOR CARRYING OUT THE INVENTION

Hereinafter, the present invention will be described in more detail with reference to specific examples. However, the following examples are merely illustrative of the present invention and are not intended to limit the scope of the present invention. It will be apparent to those skilled in the art that various changes and modifications can be made without departing from the scope and spirit of the invention, and it is obvious that such variations and modifications are within the scope of the appended claims.

Preparing Graphene Flakes and Preparing Graphene

1: Example 1: Preparing Graphene Flakes 20 ml of tetrahydrofuran solvent was added with 2.56 g of naphthalene and potassium (K) was dissolved therein at a molar concentration of 1 mol to prepare an ion solution. The ion solution was placed in a glove box and mixed with graphite to a concentration of 100 mg/ml to prepare a graphite mixed solution. Thereafter, the graphite mixed solution was stirred at 30° C. for 6 hours at 100 rpm to 200 rpm using a magnetic stirrer. Thereafter, the ion solution was removed from the stirred graphite mixed solution and residual solid components were washed with cyclohexane. 1 g of the washed solid components and 1 g of polyvinylpyrrolidone (PVP) were added to 1 L of dimethyl sulfoxide (DMSO, and the mixture was subjected to sonication dispersion for 30 minutes using a water tank-type ultrasonic device (Branson Ultrasonic bath). Thereafter, a material completely dispersed ultrasonically was subjected to centrifugation for 1 hour at 2000 rpm using a centrifugal separator (Hanil Science Combi-514R) to separate only an upper layer portion. Materials in the separated upper layer portion were once again subjected to centrifugation for an hour at 10000 rpm using the centrifugal separator (Hanil Science Combi-514R) to remove residual solvent left in the upper layer portion, and then graphene flakes were obtained.

2: Comparative Example 1

BTR-(GN-01) was prepared as a commercial graphene instead of the graphene flakes of Example 1.

3: Comparative Example 2

Super C-PAS1003 was prepared as a commercial graphene instead of the graphene flakes of Example 1.

Preparing Slurry for Forming an Electrode

1: Example 2

(1) Preparing Conductive Agent Dispersion Composition 3 g of graphene flakes prepared according to Example was mixed with N-methyl-2-pyrrolidone (NMP) which is a solvent such that the graphene flakes have a concentration of 0.5 mg/ml to 5 mg/ml, and was dispersed in the solvent through sonication dispersion for 5 minutes to 20 minutes using the water tank-type ultrasonic device (Branson Ultrasonic bath).

(2) Preparing Slurry for Forming Positive Electrode

To the conductive agent dispersion composition, 250 g of $LiNi_{0.6}Mn_{0.2}Co_{0.2}O_2$ as a positive electrode active material and 2.5 g of polyvinylidene fluoride (PVDF) as a binder were added and then mixed to prepare a slurry for forming a positive electrode. The graphene flakes are included in an amount of 1.17 parts by weight based on 100 parts by weight of solid components in the slurry for forming a positive electrode except for the solvent.

2: Example 3

A conductive agent dispersion composition and a slurry for forming a positive electrode were prepared in the same manner as in Example 2 except that 3.3 g of graphene flakes prepared according to Example 1 was mixed, when preparing the conductive agent dispersion composition. The graphene flakes are included in an amount of 1.29 parts by weight based on 100 parts by weight of solid components in the slurry for forming a positive electrode except for the solvent.

3: Example 4

A conductive agent dispersion composition and a slurry for forming an electrode were prepared in the same manner as in Example 2 except that 2.7 g of graphene flakes prepared according to Example 1 was mixed, when preparing the conductive agent dispersion composition. The graphene flakes are included in an amount of 1.06 parts by weight based on 100 parts by weight of solid components in the slurry for forming a positive electrode except for the solvent.

4: Comparative Example 3

A conductive agent dispersion composition and a slurry for forming a positive electrode were prepared in the same manner as in Example 2 except that 3 g of commercial graphene (BTR-(GN-01) was used instead of the graphene flakes used in Example 2, when preparing the conductive agent dispersion composition. The commercial graphene (BTR-(GN-01) is included in an amount of 1.17 parts by weight based on 100 parts by weight of solid components in the slurry for forming a positive electrode except for the solvent.

5: Comparative Example 4

A conductive agent dispersion composition and a slurry for forming an electrode (positive electrode) were prepared in the same manner as in Example 2 except that 3 g of commercial graphene (Super C-PAS1003) was used instead of the graphene flakes used in Example 2, when preparing the conductive agent dispersion composition. The commercial graphene (Super C-PAS1003) is included in an amount of 1.17 parts by weight based on 100 parts by weight of solid components in the slurry for forming a positive electrode except for the solvent.

6: Comparative Example 5

A conductive agent dispersion composition and a slurry for forming a positive electrode were prepared in the same manner as in Example 2 except that 3 g of carbon nanotube was used instead of the graphene flakes used in Example 2, when preparing the conductive agent dispersion composition. The carbon nanotube is included in an amount of 1.17 parts by weight based on 100 parts by weight of solid components in the slurry for forming a positive electrode except for the solvent.

7: Comparative Example 6

A conductive agent dispersion composition and a slurry for forming an electrode (positive electrode) were prepared in the same manner as in Example 2 except that 3 g of carbon black was used instead of the graphene flakes used in Example 2, when preparing the conductive agent dispersion composition. The carbon black is included in an amount of 1.17 parts by weight based on 100 parts by weight of solid components in the slurry for forming a positive electrode except for the solvent.

[Manufacturing Example] Manufacturing Electrode (Positive Electrode) and Lithium Secondary Battery 1: Manufacturing Positive Electrode The slurry for forming a positive electrode prepared in Examples 2-4 and Comparative Examples 3-6 was applied on an aluminum current collector with a loading amount of 630 mg/25 cm$^2$, dried at 130° C. and then roll pressed to manufacture a positive electrode.

Manufacturing Lithium Secondary Battery

Natural graphite as a negative electrode active material, carbon black as a conductive agent, and polyvinylidene fluoride (PVDF) as a binder were mixed at a weight ratio of 85:10:5, and then added with N-methylpyrrolidone as a solvent to prepare a slurry for forming a negative electrode. Then, the slurry for forming a negative electrode was applied on a copper current collector to manufacture a negative electrode.

A porous polyethylene separator was interposed between the positive electrode and the negative electrode which were prepared as described above to prepare an electrode assembly, and then the electrode assembly was placed inside a case. Thereafter, an electrolyte was injected into the case to manufacture a lithium secondary battery. At this time, the electrolyte was prepared by dissolving lithium hexafluorophosphate (LiPF$_6$) of 1.0 M concentration in an organic solvent composed of ethylene carbonate/dimethyl carbonate/ethylmethyl carbonate (mixing volume ratio of EC/DMC/EMC=3/4/3).

Experimental Example

1: Experimental Example 1: X-Ray Diffraction Analysis

The graphene flakes prepared in Example 1 and the graphene of Comparative Examples 1 and 2 were pulverized and measured with an X-ray diffraction analyzer (Bruker AXS D4-Endeavor XRD). The measurement was performed by scanning at 0.2° intervals by having an applied voltage of 40 kV, an applied current of 40 mA, and a range of 2θ to be measured of 24° to 28°. At this time, a variable divergence slit of 6 mm was used as a slit, and a large PMMA holder (diameter=20 mm) was used in order to eliminate the background noise caused by the PMMA holder. The intensity ratio of a peak at 25.44° was measured using EVA program (Bruke Co.). Also, the crystallinity of the graphene flakes prepared in Example 1 and the graphenes in Comparative Examples 1 and 2 were confirmed, and the position(° at which the maximum peak appeared in the range of 24° to 28° of 2θ and the Full Width at Half-Maximum (FWHM) of the maximum peak in the data graph (see FIG. 1) obtained by X-ray diffraction (XRD) are shown in Table 1 below.

TABLE 1

| | Analysis item | Example 1 | Comparative Example 1 | Comparative Example 2 |
|---|---|---|---|---|
| XRD | Peak position (°) | 25.44 | 26.51 | 26.51 |
| | FWHM | 0.71 | 0.38 | 0.35 |

FIG. 1 is a data graph obtained by X-ray diffraction (XRD) of the graphene flakes of Example 1 and the graphene of Comparative Examples 1 and 2 according to the present invention. A broad peak was observed at 25.44° in Example 1, and a narrow peak was observed at 26.51° in Comparative Examples 1 and 2.

2: Experimental Example 2: Aspect Ratio Analysis

The average lateral size and the average thickness of the graphene flakes of Example 1 and the graphene of Comparative Examples 1 and 2 were measured. First, the conductive agent dispersion composition of Example 2 in which the graphene flakes of Example 1 were dispersed, and the conductive agent dispersion compositions of Comparative Examples 3 and 4 in which the graphene of Comparative Examples 1 and 2 was dispersed were dropped in a silicon wafer. At this time, the lateral size and the thickness of graphene flakes observed using an atomic force microscope (AFM) were measured, respectively. Among these, the top 50 and the bottom 50 according to the order of the length thereof were collected to calculate the average lateral size and the average thickness by averaging the same, and then an aspect ratio of the calculated average lateral size to the calculated average thickness was measured and shown in Table 2 below.

TABLE 2

| Analysis item | Example 1 | Comparative Example 1 | Comparative Example 2 |
|---|---|---|---|
| Average lateral size (μm) | 5.04 | 8.99 | 6.99 |
| Average thickness (nm) | 4.15 | 790 | 253.25 |
| Aspect ratio | 1214.46 | 11.38 | 27.60 |

Referring to Table 2, the aspect ratios of Examples were significantly greater than those of Comparative Examples.

3: Experimental Example 3: Raman Spectroscopy Analysis

An average value was calculated from ratios of the maximum peak intensity of a D band ($I_D$) in the range of 1340 $cm^{-1}$ to 1360 $cm^{-1}$ to the maximum peak intensity of a G band $I_G$) in the range of 1575 $cm^{-1}$ to 1600 $cm^{-1}$ of the graphene flakes of Example 1 and the graphene of Comparative Examples 1 and 2, the ratios obtained by a Raman spectroscopy analysis method using a laser having a wavelength of 532 nm.

TABLE 3

| Analysis item | Example 1 | Comparative Example 1 | Comparative Example 2 |
|---|---|---|---|
| $I_D/I_G$ | 0.11 | 0.056 | 0.056 |

Referring to Table 3, when comparing with Comparative Examples, the $I_D/I_G$ value was higher than that of Comparative Example 1.

4: Experimental Example 4: XPS(X-Ray Photoelectron Spectroscopy) Analysis

Figure 2:
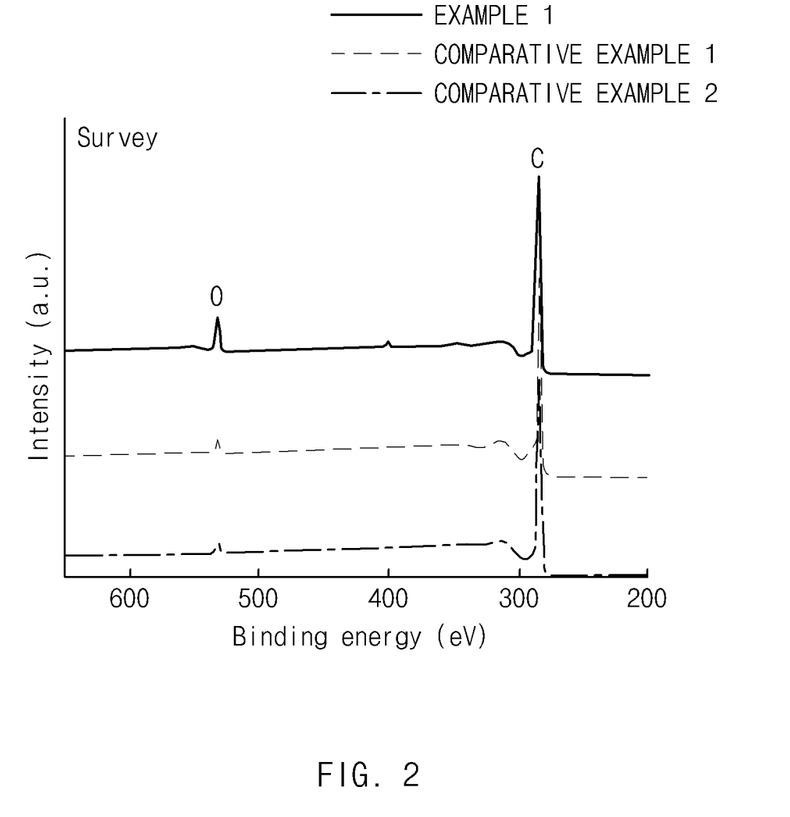
FIG. 2 is a data graph obtained by an XPS analysis of the graphene flakes of Examples 1 and Comparative Examples 1 and 2 of the present invention.

The atomic % of constituent atoms of the graphene flakes of Example 1 and of the graphene of Comparative Examples 1 and 2, which have been obtained by a XPS analysis are shown in Table 4 below. FIG. 2 is a data graph obtained by an XPS analysis of the graphene flakes of Examples 1 and the graphene of Comparative Examples 1 and 2 according to the present invention.

TABLE 4

| Analysis item | Example 1 | Comparative Example 1 | Comparative Example 2 |
|---|---|---|---|
| Carbon (atom %) | 90.49 | 96.67 | 94.77 |
| Oxygen (atom %) | 7.63 | 3.33 | 2.89 |
| Nitrogen (atom %) | 1.88 | — | 2.34 |

Referring to Table 4 and FIG. 2, the oxygen atomic % the graphene flakes of Example 1 is higher than those of the graphene flakes according to Comparative Examples.

Figure 3:
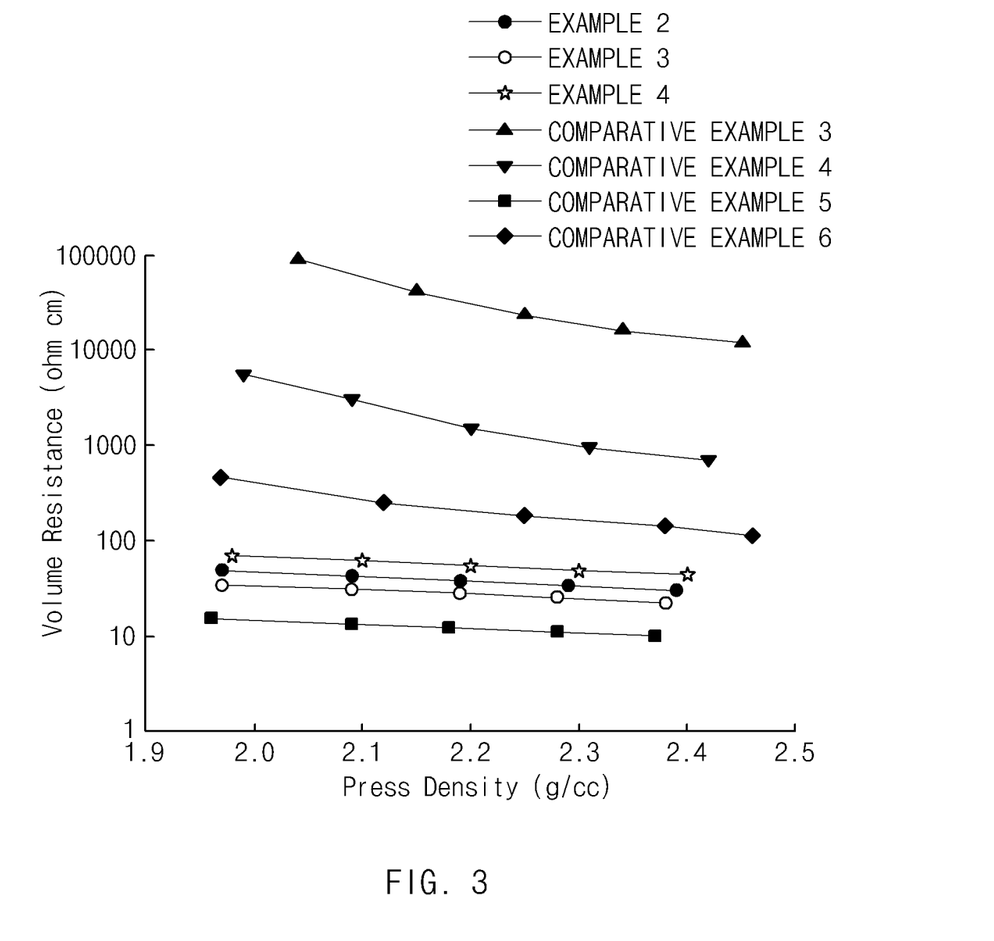
FIG. 3 is a graph showing changes in powder resistance according to press density of the slurry for forming an electrode according to Examples 2-4 and Comparative Examples 3-6.

5: Experimental Example 5: Measurement of Powder Resistance of Slurry for Forming Electrode The change in powder resistance according to the press density of the slurry for forming an electrode prepared in Examples 2-4 and Comparative Examples 3-6 was measured, and the results are shown in FIG. 3.

The powder resistivity was measured by drying and then grinding each prepared slurry for forming an electrode, and then by varying the press density using a powder resistance measuring device (HPRM-A2, Hantec Co.).

TABLE 5

| Press density (g/cc) | Powder resistance (ohm · cm) | | | | | | |
|---|---|---|---|---|---|---|---|
| | Example 2 | Example 3 | Example 4 | Comparative Example 3 | Comparative Example 4 | Comparative Example 5 | Comparative Example 6 |
| 2.1 | 41.6 | 31.6 | 63.3 | 62018 | 2797 | 13.2 | 277.3 |
| 2.2 | 38.2 | 28.5 | 55.1 | 29485 | 1542 | 12.2 | 208.3 |
| 2.3 | 33.6 | 25.3 | 49.7 | 19297 | 1009 | 10.7 | 170.8 |
| 2.4 | 30.3 | 22.0 | 45.5 | 14018 | 748 | 9.9 | 137.8 |

In the case of Examples containing the same content, the power resistance thereof was significantly lower than that of all Comparative Examples except for Comparative Example 5. Although the powder resistance of Comparative Example 5 was lower than that of Examples, the adhesion and battery capacity retention rate thereof was confirmed to be even lower than those of Examples.

Figure 4:
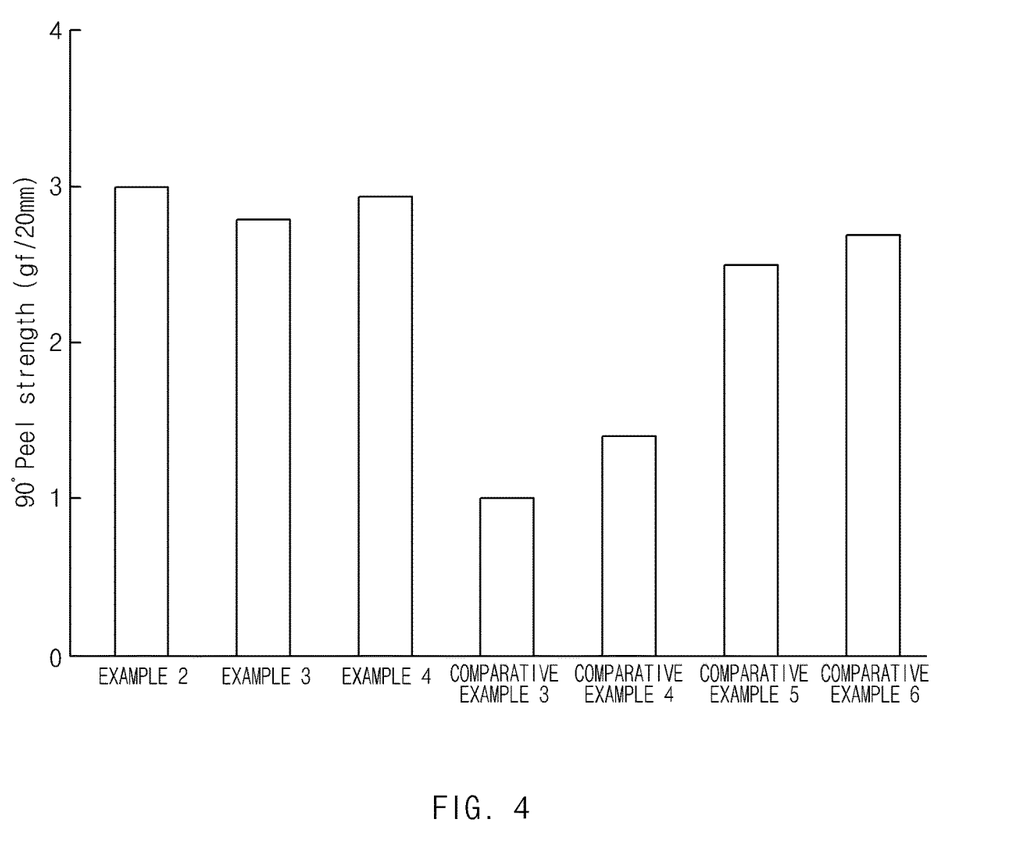
FIG. 4 is a graph showing results of measuring adhesion when the slurry for forming an electrode according to Examples 2-4 and Comparative Examples 3-6 is peeled at 90°.

6: Experimental Example 6: Measurement of Adhesion of Slurry for Forming Electrode The adhesion was measured by applying the slurry for forming an electrode prepared in Examples 2-4 and Comparative Examples 3-6 on a substrate (aluminum foil) and then pulling the dried slurry up to 90° at a rate of 100 mm/min to measure a force (gf) applied until the dried slurry was dropped. The results are shown in Table 6 and FIG. 4 below.

TABLE 6

| | Example 2 | Example 3 | Example 4 | Comparative Example 3 | Comparative Example 4 | Comparative Example 5 | Comparative Example 6 |
|---|---|---|---|---|---|---|---|
| Adhesion (gf/cm) | 3.0 | 2.8 | 2.9 | 1.0 | 1.4 | 2.5 | 2.7 |

Referring to Table 6, the adhesion of the slurry for forming an electrode prepared according to Examples was superior to that of Comparative Examples.

7: Experimental Example 7: Evaluation of High-Temperature Cycle Capacity Retention Rate of Lithium Secondary Battery The lithium secondary battery manufactured in Manufacturing Example was charged and discharged based on 1 cycle of charging and discharging under conditions of 45° C., SOC 50%, and 10 C, and the cycle capacity retention rate was measured up to 1800 cycles (300, 600, 900, 1800). The measured capacity retention rates are shown in Table 7 and FIG. 5 below.

TABLE 7

| Capacity retention rate (%) | Example 2 | Example 3 | Example 4 | Comparative Example 3 | Comparative Example 4 | Comparative Example 5 | Comparative Example 6 |
|---|---|---|---|---|---|---|---|
| 300 cycle | 96.3 | 95.9 | 95.7 | 95.6 | 96.1 | 96.3 | 96.1 |
| 600 cycle | 95.1 | 94.8 | 94.3 | 93.2 | 93.9 | 95.1 | 94.5 |
| 900 cycle | 93.9 | 93.2 | 92.9 | 90.2 | 91.8 | 93.7 | 92.9 |
| 1800 cycle | 92.0 | 91.7 | 90.9 | 83.0 | 87.1 | 91.3 | 89.5 |

Figure 5:
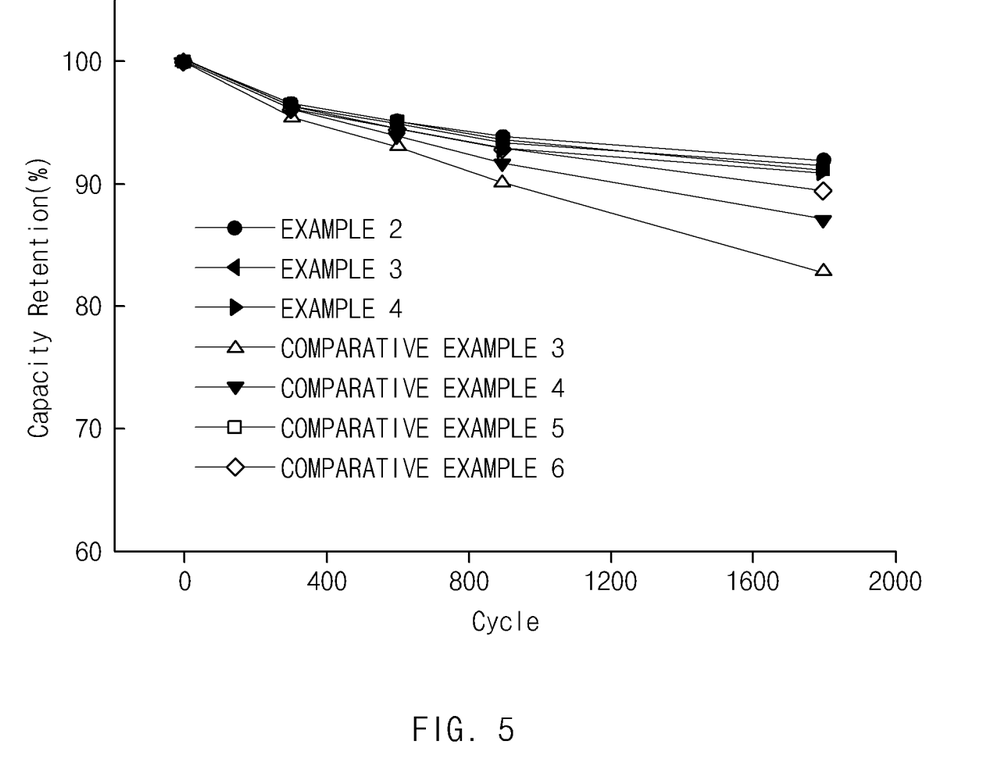
FIG. 5 is a graph showing a capacity retention rate (%) of the secondary battery manufactured according to Manufacturing Example of the present invention, the capacity retention rate according to a cycle at 45° C.

Referring to Table 7 and FIG. 5, the capacity retention rate of Examples was higher than that of Comparative Examples. Meanwhile, in the case of Comparative Example 5, it can be confirmed that the capacity retention rate thereof was further decreased compared to Example 2, as the number of cycles increased.

Figure 6:
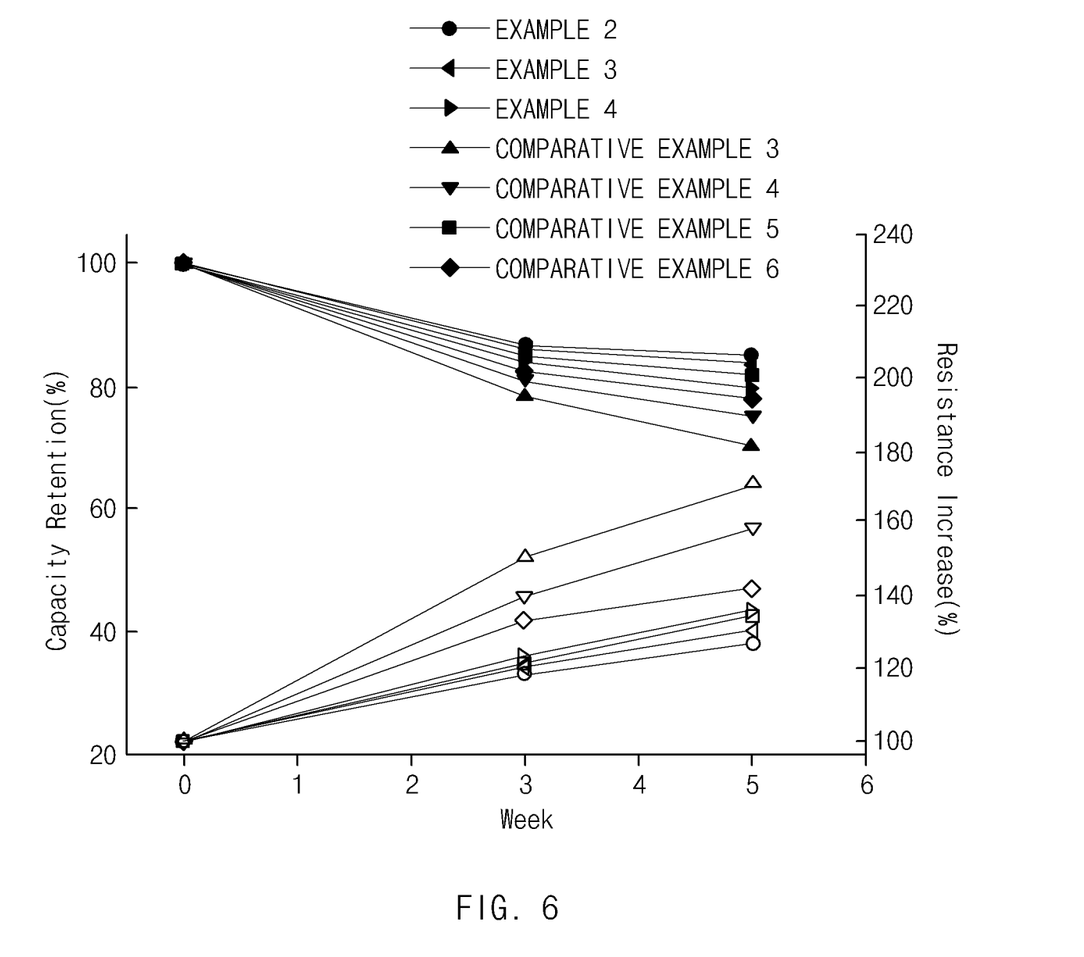
FIG. 6 is a graph showing a capacity retention rate (%) and a resistance increase rate (%) of the secondary battery manufactured according to Manufacturing Example of the present invention, the capacity retention rate and the resistance increase rate measured by the week at 60° C.

8: Experimental Example 8: Evaluation of High-Temperature Cycle Capacity Retention Rate of Lithium Secondary Battery The capacity retention rate and the resistance increase rate of the lithium secondary battery prepared in Manufacturing Example were measured by charging the battery under conditions of 60° C. and SOC 100% by the week up to the $5^{th}$ week. The measured capacity retention rates and the resistance increase rates are shown in Table 8 and FIG. 6 below. In FIG. 6, the capacity retention rate may be confirmed with an upper graph, and the resistance increase rate may be confirmed with a lower graph.

TABLE 8

| Week | | Example 2 | Example 3 | Example 4 | Comparative Example 3 | Comparative Example 4 | Comparative Example 5 | Comparative Example 6 |
|---|---|---|---|---|---|---|---|---|
| $3^{rd}$ week | Capacity retention rate (%) | 86.9 | 86.5 | 84.6 | 78.6 | 81.4 | 85.3 | 82.5 |
| | Resistance increase rate (%) | 118.8 | 121.5 | 123.5 | 150.8 | 139.9 | 121.6 | 133.3 |
| $5^{th}$ week | Capacity retention rate (%) | 85.2 | 83.9 | 80.1 | 70.4 | 75.5 | 82.0 | 77.9 |
| | Resistance increase rate (%) | 126.8 | 131.5 | 135.6 | 171.3 | 158.3 | 134.4 | 142.0 |

Referring to Table 8 and FIG. 6, the capacity retention rate of the lithium secondary battery according to Examples were higher but the resistance increase rate thereof was lower. Meanwhile, in the case of Example 2, compared with Comparative Example 5, the capacity retention rate was higher and the resistance increase rate was lower.

The invention claimed is:

1. A conductive agent comprising, graphene flakes having a maximum peak in a range of 24.5° to 26° of 2θ in a data graph obtained by a X-Ray Diffraction (XRD) analysis, wherein an aspect ratio of an average lateral size of the surfaces of the graphene flakes to an average thickness of the graphene flakes in a direction perpendicular to surfaces of the graphene flakes is 500 to 50,000.

2. The conductive agent of claim 1, wherein the average thickness of the graphene flakes is 1 nm to 10 nm.

3. The conductive agent of claim 1, wherein a Full Width at Half-Maximum (FWHM) of the maximum peak in the range of 24.5° to 26° of 2θ of the graphene flakes is 0.5° to 5°.

4. The conductive agent of claim 1, wherein the graphene flakes have an average ratio of a maximum peak intensity of a D band at 1360±50 cm$^{-1}$ to a maximum peak intensity of a G band at 1580±50 cm$^{-1}$ of 0.06 to 0.5, obtained by Raman spectroscopy using a laser having a wavelength of 532 nm.

5. The conductive agent of claim 1, wherein an average oxygen content of the graphene flakes is 5 atom % to 10 atom %.

6. A slurry for forming an electrode, the slurry comprising:
   an electrode active material;
   a binder;
   a dispersion medium; and
   the conductive agent of claim 1.

7. The slurry of claim 6, wherein the conductive agent is included in an amount of 0.05 parts by weight to 2.0 parts by weight based on 100 parts by weight of solid components in the slurry for forming an electrode except for the dispersion medium.

8. The slurry of claim 6, wherein when the solid components in the slurry for forming an electrode except for the dispersion medium are included in an amount of 50 parts by weight to 65 parts by weight based on 100 parts by weight of the slurry for forming an electrode, a viscosity of the slurry for forming an electrode is 5,000 cPs to 35,000 cPs under a temperature condition of 24° C. to 26° C.

9. An electrode comprising:
   an electrode current collector; and
   an electrode active material layer formed on the electrode current collector, wherein the electrode active material layer comprises an electrode active material and the conductive agent according to claim 1.

10. A lithium secondary battery comprising a positive electrode, a negative electrode, and an electrolyte, wherein at least one of the positive electrode or the negative electrode is an electrode according to claim 9.

* * * * *